Aug. 4, 1953 P. R. HORNBROOK 2,647,802
PNEUMATIC UNLOADER
Filed Dec. 13, 1949 3 Sheets-Sheet 1
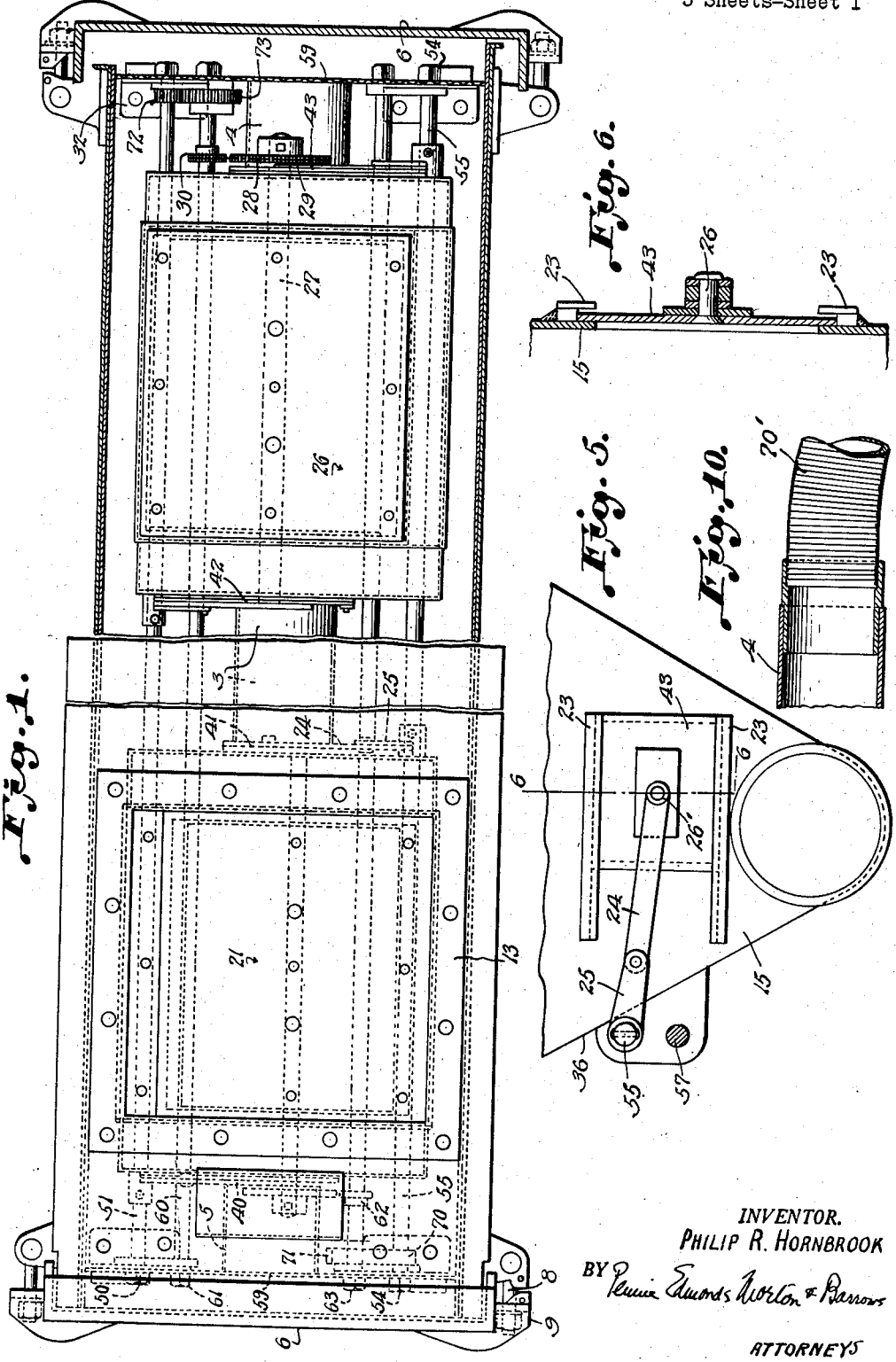
INVENTOR.
PHILIP R. HORNBROOK
BY
ATTORNEYS

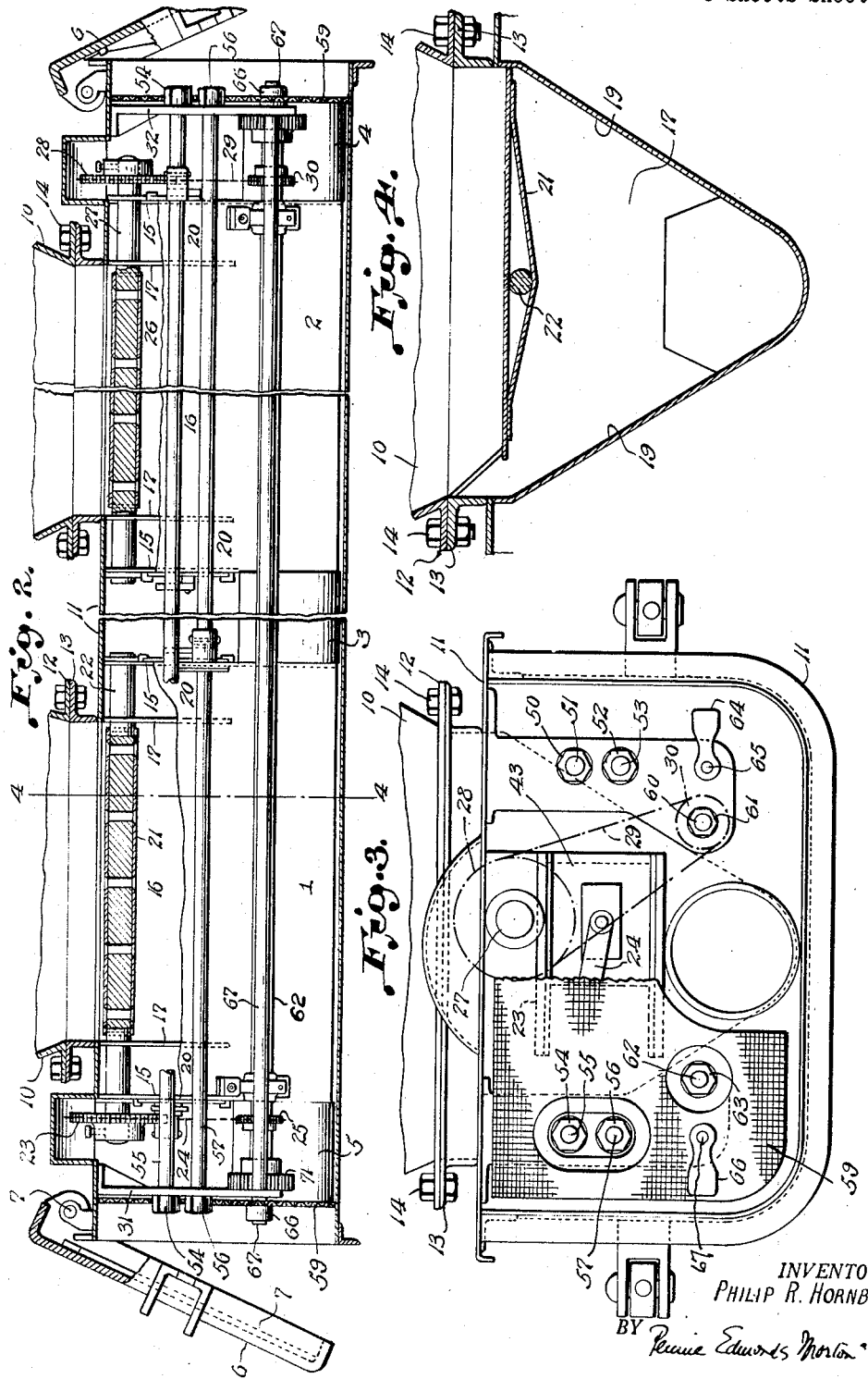

Aug. 4, 1953 P. R. HORNBROOK 2,647,802
PNEUMATIC UNLOADER
Filed Dec. 13, 1949 3 Sheets-Sheet 3
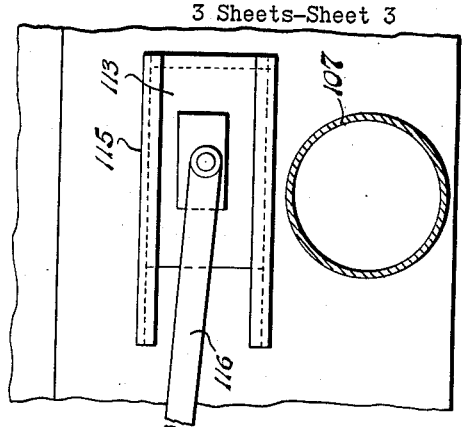
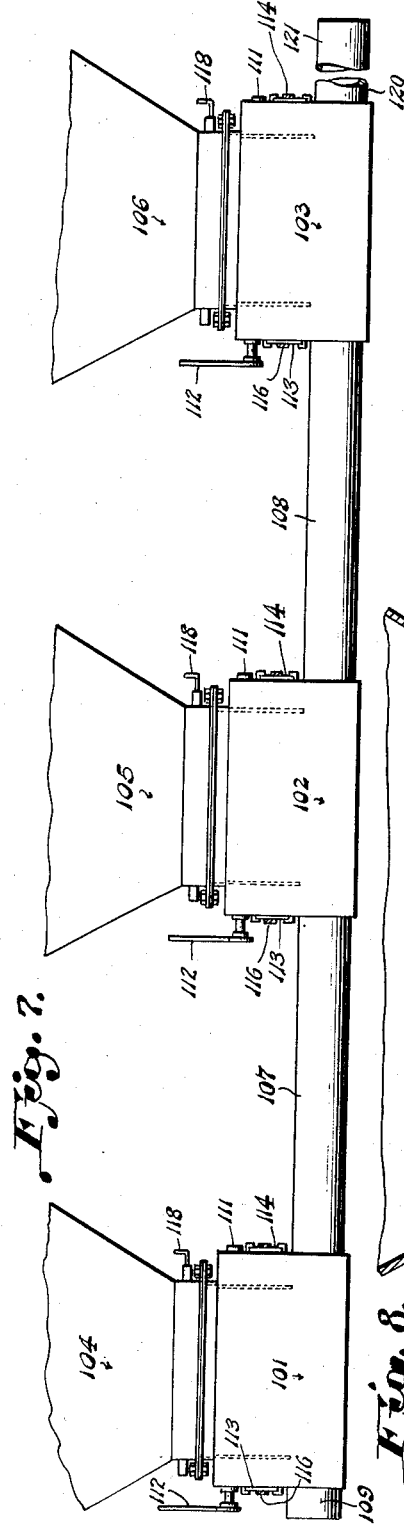
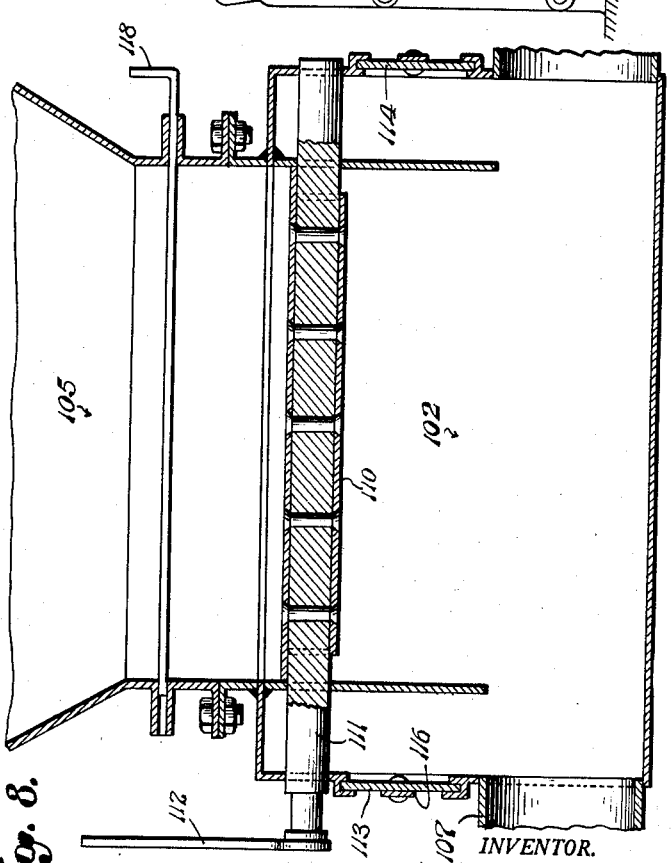
INVENTOR.
PHILIP R. HORNBROOK
BY
*Renwick Edmonds Morton & Barrows*
ATTORNEYS Patented Aug. 4, 1953

2,647,802

UNITED STATES PATENT OFFICE 2,647,802

PNEUMATIC UNLOADER

Philip R. Hornbrook, Allentown, Pa., assignor to Fuller Company, Catasauqua, Pa., a corporation of Delaware Application December 13, 1949, Serial No. 132,669

9 Claims. (Cl. 302—27)

This invention relates to apparatus for unloading hopper bottom vessels and similar receptacles, and more particularly, is concerned with a novel unloader for hopper bottom vehicles. The new unloader is primarily intended for use in unloading flour, but may be used on any pulverulent or granular material, made up of particles from micronic size up to several inches in diameter, and capable of being entrained in an air stream and delivered through a conduit to a desired point.

This apparatus of the invention is intended for use in conjunction with pneumatic conveying systems of the type that are widely used for transporting pulverulent or crushed materials entrained in an air stream. Such pneumatic systems usually have a receiver, maintained under reduced pressure by suitable means, connected to one end of a conduit. The other end of the conduit is connected to an unloader adapted to be inserted into material to be conveyed. The unloader includes a nozzle, with air admitted into the unloader adjacent the nozzle, entraining the material, and causing a flow of air and material through the conduit into the receiver as a result of the reduced pressure within the receiver.

Unloaders of the kind heretofore used in the conveying systems described have been found to have certain disadvantages when the systems are used for unloading receptacles of the hopper bottom type, especially hopper bottom vehicles, in which the unloader nozzle lies below the well of the hopper. For example, when certain materials within the receptacle are transported or stored for a considerable time, they lose their free-flowing characteristics, so that, as the material adjacent the nozzle is removed during the operation a cavity is left around the nozzle, with the result that the entraining air traveling into the nozzle fails to loosen the material and to transport it through the system. Similarly, when the receptacle is nearly empty, it has not been possible to effect complete removal of the material, and a substantial amount of the material is left behind. Certain materials, such as flour, are subject to deterioration, and if left in the receptacle, even in small quantities, may completely contaminate the next shipment; therefore, the failure of the apparatus to empty the receptacle completely, requires that expensive cleaning operations be performed prior to each shipment.

Certain unloaders have been developed which are not subject to some of the objections stated, but these unloaders operate at poor efficiency with much labor and time required to shift from an empty vessel to a full vessel. Also, none of the unloaders is of such design that will enable them to be connected in series so that a number of vessels can be unloaded through a single discharge tube. The prior design also prevented two or more of the unloaders to be formed into a single unloading unit.

The present invention is, accordingly, directed to a novel unloader for use with pneumatic conveying apparatus, which overcomes the objections to prior unloaders in that it permits the vessel, to which it is attached, to be completely emptied; also, it may be so constructed that it can be attached to a plurality of vessels which can then be emptied in succession with little labor involved in the change over. The new unloader requires no manual labor during its operation, and it operates at a rapid rate to discharge from either side of the vessel. It can be equipped to provide filtered air for conveying, and may thus be used in unloading materials that are subject to contamination.

The new unloader, in a form suitable for emptying a plurality of vessels, such as the compartments of a hopper bottom railroad car, includes a casing having a number of receptacles, each connected to one of the hopper bottoms. Adjacent receptacles are connected by tubes at their lower ends, and at least one of the receptacles, and preferably both, has a discharge tube leading from its lower end, for connection to a transport line maintained under reduced pressure. The tubes are open to the interior of the respective vessels, and air is admitted into each tube to effect movement of the material from the receptacle, through the discharge tube and into the transport line. To insure that material adjacent the intake of the discharge tube will be properly picked up and entrained, the air entering the tube is caused to impinge downwardly upon a surface of the material at the intake of the tube, which material has a slope determined by the angle of repose thereof. The air admitted at the opposite side of the receptacle, from which the discharge tube leads, then serves to propel the material toward the discharge tube intake where it is picked up and entrained by the downwardly impinging air.

In the preferred construction of the unloader the design is adapted for use on a railroad hopper bottom car, and is provided with means to permit the railroad car to be unloaded from either side. The design of railroad cars with which the unloader is used is such that two hopper bottom vessels are located adjacent each other and in alignment athwart the longitudinal center line of the car. This arrangement forms a pair of vessels that function as a single unit. The number of these vessels, or units, that can be located along the longitudinal center line of the car will be determined by the length, or capacity, of the railroad car.

The unloader consists of a casing having two necks, or extensions, at its upper end, adapted to be connected to the hopper bottoms of the pair of vessels functioning as a unit. There is a receptacle within the casing beneath each neck which receives material discharged from the vessel through the neck. Each receptacle has two end walls and two downwardly convergent side walls. An opening is formed in the lower end of each end wall, and the openings of the adjacent end walls of adjacent receptacles are connected by a tube. A discharge tube is connected to the openings of the outer end walls of the outer receptacles. Inside the end walls of each receptacle are two vertical interior walls spaced from each end wall to form an air passage between each end wall and the adjacent interior wall, thereby providing an air passage at each end of each receptacle. An opening is provided in an upper portion of each end wall to admit air into the receptacle through the adjacent air passage. Each opening is controlled by a gate valve actuated by a linkage mechanism extending to, and operable from, the outside of each end of the casing. A material control valve is located in the neck or extension of each receptacle to control the flow of material passing through the space defined by the two inner walls thereof. This valve, also, is actuated by a mechanism extending to, and operable from, the outside of each end of the casing. The ends of the casing are provided with filtering screens, through which all of the air for the operation of the unloader is admitted.

For a better understanding of the invention, reference may be made to the accompanying drawings, in which:

Fig. 1 is a top view of one form of unloader of the invention;

Fig. 2 is a view partly in side elevation and partly in vertical section, of the unloader of Fig. 1;

Fig. 3 is an end view of the unloader of Fig. 1 with parts removed and others broken away;

Fig. 4 is a sectional view on line 4—4 of Fig. 2;

Fig. 5 is an end view showing an air intake valve;

Fig. 6 is an enlarged sectional view of the line 6—6 of Fig. 5;

Fig. 7 is a side elevational view of a modified form of the new unloader;

Fig. 8 is an enlarged longitudinal sectional view of one of the hoppers shown in Fig. 7;

Fig. 9 is an end view of the means for manually operating the air intake valve of the unloader of Fig. 7; and Fig. 10 is a view, partly in elevation and partly in section, of the connection between the discharge line of the unloader and the transport line.

The unloader shown in Figs. 1 to 6 is for use in unloading materials from vessels having hopper bottoms, mounted on a vehicle.

The device illustrated includes a casing 11 attached to two vessels 10 by means of companion flanges 12 and 13 on the lower ends of the vessels and on the upper ends of the necks or extensions of receptacles 1 and 2, respectively. These companion flanges are preferably held in position by bolts 14, but may be attached in any conventional manner, such as by welding.

Casing 11 forms an air duct for the purpose of supplying operational air for the two receptacles 1 and 2, located inside the casing. Located, and securely attached, at each end of the casing 11 is an air filter screen 59, which filters the operational air entering the casing for subsequent contact with the materials to be unloaded. The filtering of the air is of utmost importance when materials subject to contamination, such as flour, are being unloaded from the vehicle. The air duct inside casing 11 is formed by the walls of casing 11 and the side walls 19 of the receptacles. It will be seen from Figs. 3 and 4 that the space formed by the inside walls of casing 11 and the outside of the receptacle walls 19 will be ample to enable a large quantity of operational air to enter the inside of casing 11 through screen 59 and pass into either receptacle.

A door 6, fitted with a rubber gasket 7, is located at each end of casing 11 for the purpose of sealing, while in transit, the internal elements from mechanical injury. This sealing also prevents foreign matter and weather from entering the casing and possibly contaminating the material being transported. The door 6 is attached to the casing in a hinged swinging arrangement by a pin 7, and normally is locked in position by a swing bolt 8 fitted in a winged groove 9.

Each casing contains two receptacles, one for each vessel, but for the purpose of simplicity I will describe only one receptacle; and then describe the inter-relationship between the two receptacles combined as a single unit.

The receptacle 1 is formed by two outer end walls 15 attached to the top of casing 11 and extending downwardly and at right angles therefrom; and by two side walls 19 attached to the top of casing 11 and extending downwardly and inwardly therefrom. All four sides of the receptacle terminate above the bottom of the casing.

A material passage 16 is formed within the receptacle 1 by the side walls of the receptacle and the two inner walls 17 attached to the top of the casing 11, and spaced inwardly from the two end walls 15. These inner walls 17 extend downwardly from the top of casing 11 and terminate above the bottom of the receptacle.

Air passages 20, for the flow of air from the inside of the casing 11 into the inside of the receptacle, are formed by the spaced arrangement of the outer end walls 15, and the inner walls 17. An opening in each of the end walls 15, covered and controlled by gate valves 40 and 41, is provided for the admission of air from the inside of casing 11 into the air passages 20. Fig. 5 shows a preferable method of air control. In this illustration the air control valve is valve 43 of receptacle 2. The opening in the end wall 15 is covered by a sliding gate valve 43, held in a sliding contact position with the end wall of the receptacle by two flanges 23 securely attached to the end wall 15. An actuating linkage 24 and 25 is attached to the sliding gate by a pin 26', with link 25 being rigidly attached to control shaft 55 by a pin 36. The control shaft 55 extends the full length of casing 11; the ends of shaft 55 extend slightly beyond the ends of the casing and are provided with a turning nut 54 on each end, so that shaft 55 may be rotated and valve 43 opened and closed by the linkage 24—25.

For the purpose of controlling the flow of material from the vessel 10 to the receptacle 2 a rotating gate valve 26 is provided. Gate valve 26 is mounted on shaft 27, and is positioned in the material passage 16. Secured to the end of the shaft 27 is a sprocket wheel 28, connected to a sprocket wheel 30, mounted on shaft 60, by a sprocket chain 29. Shaft 60 extends from the outside of end wall 31 of the casing to the outside of end wall 32 of casing 11, and is provided with a turning nut 61 at each end for the purpose of rotating shaft 60; thereby resulting in the rotation of gate valve 26 through chain drive 30—29—28.

Referring now to the complete unit of the unloading device, Figs. 1 to 6 show the operational relationship of the individual elements. Receptacle 1 has two air control valves 40 and 41, and in a like manner, receptacle 2 has two air control valves 42 and 43. The elements of air control valve 43 have been described, and the air control valves 40, 41 and 42 are duplicates, and function in the same manner. Each air control valve is provided with an individual operating mechanism, actuated from the outside of either end of the casing. The operating nuts 50, 52, 54, and 56, positioned outside the screens 59, are attached to individual operating shafts 51, 53, 55, and 57 respectively. Control shaft 51 actuates the mechanism for air control valve 42, control shaft 53 actuates the mechanism for air control valve 40, control shaft 55 actuates the mechanism for air control valve 43, and control shaft 57 actuates the mechanism for air control valve 41.

The structure, and the actuating mechanism, of the two material control valves 26 and 21 are the same. Rotation of turning nut 61 causes a rotation of shaft 60 which results in the opening or closing of material gate valve 26, mounted on shaft 27, through the sprocket and chain drive 28, 29, 30. In a like manner, the operating shaft 62 is provided with a turning nut 63 securely attached thereto; sprocket wheel 25 is also securely mounted on shaft 62, and connected to a sprocket wheel 23, securely mounted on shaft 22, by means of a sprocket chain 24. Rotation of turning nut 63 will result in the opening or closing of material gate valve 21, mounted on shaft 22.

A locking pawl 70, mounted on shaft 67, engages a locking gear 71, mounted on shaft 62, for the purpose of locking material gate valve 21 in a closed position; thereby insuring against leakage of material from vessel 10 into the receptacle 1 while in transit. In a like manner material gate valve 26 is locked in a closed position by a locking pawl 72, mounted on shaft 65 and engaging a locking gear 73 mounted on shaft 60. Attached to ends of shafts 65 and 67 are turning handles 64 and 66, respectively. These turning handles, located outside each filter screen 59, are for the purpose of actuating the locking pawl 72 to cause it to engage or disengage the locking gear.

Receptacles 1 and 2 are connected one to the other, for the purpose of discharging materials from one receptacle through the adjacent receptacle, by a connecting tube 3. Receptacle 2 has a discharge tube 4 attached to its outer end wall 15, and extending outwardly therefrom for connection to a plant transport line 70' by a sliding suction seal connection, as shown in Fig. 10. The transport line 70' is adapted to fit inside the discharge tube 4, and is held in place by the reduced pressure inside the transport line. This connection may be of any conventional type, but I prefer to use this arrangement because of the ease and efficiency in connecting and unconnecting the discharge tube from the transport line. In a like manner, receptacle 1 has a discharge tube 5 attached to its outer end wall 15 and extending outwardly therefrom for connection to a transport line, as shown in Fig. 10.

The operation of the vehicle type unloader is as follows. After the loaded vehicle has arrived at its destination, closure member 6, on the side adjacent the plant transport line 70', is opened to give access to, for example, discharge tube 4. The end of the plant transport line is slipped inside the outer end of discharge tube 4; being held in position by the reduced pressure within the system. With the transport line thus connected to the discharge tube 4, there is now communication between the inside of the receptacles and the plant receiver to which the other end of the transport line is connected, and the entire system is now under reduced pressure.

Material gate 21 of receptacle 1, for example, is opened to allow material in the overlying vessel 10 to drop to the bottom of the receptacle 1. To open material gate 21, locking pawl handle 66 is turned to disengage the locking pawl 70 from the gear 71, thereby permitting shaft 62 to be rotated. Turning nut 63 is engaged with a suitable wrench and shaft 62 rotated. As this rotation takes place shaft 22 will also be rotated because of the chain drive connection, 25—24—23, between shaft 62 and shaft 22. With the material gate valve 21 mounted on shaft 22, the rotation of turning nut 63 will result in its opening, or closing.

As the material falls to the bottom of receptacle 1, air control valve 41 is opened by rotation of turning nut 56 and shaft 57, through the connecting linkage between the shaft 57 and the control valve, to permit entraining air to enter through the screen 59 into the space within the casing, between the walls thereof and the walls 19 of the receptacles. As all of the openings in the end walls 19 which are controlled by the air control valves have access to this air space the opening of air control valve 41 causes the flow of air from such space into receptacle 1 through the air passage 20. The entraining air flowing through the air passage 20 impinges against the toe of the pile of material at the bottom of the air passage and in front of the connecting tube 3, and then passes out through the connecting tube 3, discharge tube 4, and transport line 70' on to the plant receiver. As the air passes over the toe of the pile, the material is picked up and entrained in the air stream due to the mass velocity of the air, and the changing of direction of the air stream over the toe of the pile.

To permit air to flow through the pile of material on its way to the discharge tube 4, air control valve 40 at the other end of the receptacle 1 may be opened, through the linkage connecting the valve to shaft 53, by the rotation of turning nut 52. The movement of air through the pile of material in the receptacle is beneficial in that it causes an aeration or fluidizing effect on the material. This aeration or fluidization creates a flowing characteristic, causing the pile of material to move toward the discharge side into the flow of entraining air entering through the air control valve 41. The movement of air through the pile of material not only aids in the unloading, but is sufficient to discharge the material from the receptacle; however, the efficiency of discharge is greatly increased by the entraining air passing over the toe of the pile.

It will be seen from Figs. 1 and 2 that the flow of air through the pile of material may be attained by any of several methods. Either, or both, air control valves of receptacle 2 may be opened, with, or without, air control valve 40 being opened; or both air control valves of receptacle 2 and air control valve 40 may be closed, the air for cross-flowing through the material will then enter at the opposite end of the casing through the discharge tube 5.

With two or more air control valves opened, the vacuum in the system, created by the reduced pressure at the source, will decrease. The operator, by adjusting the leading air control valve, that is, the valve nearest the discharge tube in use, will regulate the amount of entraining air entering the system to the point where the vacuum in the system will be the greatest for the corresponding maximum weight of material discharge.

After the receptacle has been unloaded there will usually be small pockets of material left throughout the receptacle. These pockets must be removed since they may possibly contaminate the next shipment. To remove these, air control valve 41 is closed. All air then enters the receptacle through air control valve 40, picking up the small pockets of material and discharging them through the discharge tube 3 into the transport line. This method of cleaning will leave the vessel in readiness for the next shipment.

Under certain operating conditions within the plant system, such as, when the plant transport line lies on an even grade or a negative sloping grade, the unloader will operate satisfactorily with all the air control valves closed, with the only air admission being through the opposite discharge tube. Under such conditions, the amount of work placed on the vacuum-creating means at the receiver is only such that a sufficient operating vacuum can be maintained within the system merely by permitting the operating air to enter through the material from the vessel into the respective receptacles, or through the material from the opposite discharge tube into the receptacle, but, if there is any appreciable increase in the grade of the transport line from a horizontal position to a positive slope, or the material is closely packed in the vessel and the receptacles, the air valves must be used, as described above.

The procedure for unloading receptacle 2 is the same as was described for receptacle 1, except that air control valves 42 and 43 are placed in operation by the rotation of turning nuts 54 and 56, respectively.

In Figs. 7 to 9, I show a modification of my invention. The principle of operation and the basic receptacle structure are the same as for my vehicle unloading device. This modification is applicable to a stationary vessel arrangement, such as vessels used for storage inside a plant; although such an arrangement may be used in any environment where it is desired to transfer materials from several vessels to another location.

The basic structure of the modified unloader is the same. The principal difference being in the mode of operating the different valves. Each valve 113 and 114, is provided with a separate operating handle, for example, air control valve 113 is connected to the operating handle 117 by a link 116. Also, the shaft of each material gate valve 110 is provided with a rotating handle lever 112 at an end thereof to open and close the valve. A bin slide 118 is provided above each material gate valve to enable the unloader to be disconnected from the vessel for repair.

If it is desired to remove the material, or a portion of the material, from vessel 105, for example, and transfer it to a different location through the discharge tube 107, the bin slide 118 is pulled from the lower portion of vessel 105 to permit the material to fall to the top of material gate valve 110. To open the material gate valve, handle lever 112 is turned, resulting in the rotation of shaft 111, and the opening of the material gate mounted thereon. With this valve open, the material in vessel 105 will fall to the bottom of receptacle 102 in a position to be discharged.

The operating handle 117 is pulled, and through link 116 the leading air control valve 113 is opened to admit entraining air to pass across the toe of the material in the receptacle. Such flow of air results from the reduced pressure maintained in the receptacle because of its connection to a source of reduced pressure at the desired point of discharge of the material. With a similar lever, air control valve 114 may be opened to permit air to flow through the pile of material in the receptacle to cause an aeration or fluidizing effect on the material which facilitates movement of the material across the receptacle into the path of the entraining air.

When vessel 105 has been emptied, or the desired amount has been removed therefrom, the valves of receptacle 102 are restored to their closed position, and another vessel containing the same, or different material, may be discharged in like manner.

Each vessel is connected one to the other by a connecting tube extending between adjacent vessels, such as 107, 108, etc., with the leading receptacle having a discharge tube, in this case, receptacle 101 having the discharge tube 109.

If it is desired, the connecting tube extending from the far side of the last vessel on the line, such as the tube 120, and the opening sealed; or such tube may be used as a discharge tube, thereby providing discharge means at either end of the system.

From the foregoing, it can be seen that such an arrangement of connecting vessels, discharging through a single tube, will have a great advantage, and efficiency where the vessels are used as a storage for different materials to be mixed or blended in a common mixing chamber in accordance with a desired formula.

Various changes may be made in the details of construction of the unloading apparatus of the present invention without sacrificing any of the advantages thereof or departing from the scope of the appended claims.

I claim:

1. In an unloader for a pair of hopper-bottom vessels, the combination of a casing having a pair of necks extending from its top and adapted to be connected to the hopper bottoms of the two vessels, a receptacle within the casing beneath each neck for receiving material from the vessel through said neck, each receptacle including end walls and downwardly convergent side walls, an opening at the lower end of each end wall of each receptacle, a tube connecting the receptacles through the openings in the adjacent end walls, a discharge tube leading from the opening in the outer end wall of at least one receptacle, means within each receptacle forming an air passage leading downwardly along at least one end wall thereof and terminating at about the level of the tops of the respective end wall openings, each air passage having an intake opening communicating with the interior of the casing and means for controlling the flow of air through the intake openings of the passages.

2. In an unloader for a pair of hopper-bottom vessels, the combination of a casing having necks at its upper side adapted to be connected to the hopper bottoms of the two vessels, a receptacle within the casing beneath each neck for receiving material from the vessel through said neck, each receptacle including opposed vertical end walls and downwardly convergent side walls, each end wall having an opening at its lower end, a tube connecting the receptacles through the openings in the adjacent end walls, a discharge tube leading from the opening in the outer end wall of each of the receptacles, means within each receptacle including a vertical inner wall spaced from each end wall of the receptacle and forming air passages terminating at about the level of the tops of the respective end wall openings, each inner wall extending downwardly from the top of the receptacle and at least in part defining an opening at its lower end aligned with and of about the same size as the opening in the adjacent end wall, and means for admitting air into each passage above the lower end thereof for entraining material in the receptacle and discharging it through the discharge tube.

3. In an unloader for a pair of hopper-bottom vessels, the combination of a casing having a pair of necks at its upper side provided with flanges adapted to be connected to the hopper bottoms of the two vessels, a receptacle within the casing beneath each neck for receiving material from the vessel through said neck, each receptacle including opposed vertical end walls and downwardly convergent side walls, each end wall having an opening at its lower end, a tube connecting the receptacles through the openings in the adjacent end walls, a discharge tube leading from the opening in the outer end wall of each of the receptacles, means within each receptacle, including a vertical inner wall spaced from each end wall of the receptacle, forming air passages terminating at about the level of the tops of the respective end wall openings, each inner wall extending downwardly from the top of the receptacle and at least in part defining an opening at its lower end aligned with and of about the same size as the opening in the adjacent end wall, an air intake opening in each end wall for admitting air into each air passage above the lower end thereof, and a valve for controlling the flow of air through each air intake and operable from both ends of the casing.

4. In an unloader for a pair of hopper-bottom vessels, the combination of a casing having a pair of necks at its upper side adapted to be connected to the hopper bottoms of the two vessels, a receptacle within the casing beneath each neck for receiving material from the vessel through said neck, each receptacle including opposed vertical end walls and downwardly convergent side walls, each end wall having an opening at its lower end, a tube connecting the receptacles through the openings in the adjacent end walls, a discharge tube leading from the opening in the outer end wall of each of the receptacles, each receptacle having vertical interior walls spaced from each end wall and forming an air passage between each end wall and the adjacent interior wall, each interior wall extending downwardly from the top of the receptacle and at least in part defining an opening at its lower end aligned with and of about the same size as the opening in the adjacent end wall, an air intake opening in each end wall for admitting air into each air passage above the lower end thereof, a valve operable from both ends of the casing for controlling the flow of air through said air intake, a material passage formed in the receptacle beneath the hopper-bottom opening by the two interior walls, and a valve in the material passage for the control of the flow of material into the receptacle from the vessel, and operating means for said valve extending therefrom to each end of the casing.

5. In an unloader for a pair of hopper-bottom vessels, the combination of a casing having a pair of necks at its upper side provided with flanges adapted to be connected to the hopper bottoms of the two vessels, a receptacle within the casing beneath each neck for receiving material from the vessel through said neck, each receptacle including opposed vertical end walls and downwardly convergent side walls, each end wall having an opening at its lower end, a tube connecting the receptacles through the openings in the adjacent end walls, a discharge tube leading from the opening in the outer end wall of each of the receptacles, each receptacle having vertical interior walls spaced from each end wall and forming an air passage between each end wall and the adjacent interior wall, each interior wall extending downwardly from the top of the receptacle and at least in part defining an opening at its lower end aligned with and of about the same size as the opening in the adjacent end wall, an air intake opening in each end wall for admitting air into each air passage above the lower end thereof, a valve operable from both ends of the casing for controlling the passage of air through said air intake, the two interior walls forming a material passage in the receptacle beneath the overlying neck, a gate valve in the material passage for controlling the flow of material into the receptacle from the vessel, operating means for said valve extending therefrom to each end of the casing, an air filter extending across each end of the casing, a door connected to each end of the casing, and locking means for said door.

6. In an unloader for a hopper-bottom railroad vehicle, the combination of at least two hopper-bottom vessels, a casing having a pair of necks at its upper side adapted to be connected to the hopper bottoms of the two vessels, a receptacle within the casing beneath each neck for receiving material from the vessel through said neck, each receptacle including end walls and downwardly convergent side walls, an opening at the lower end of each end wall of each receptacle, the tube connecting the receptacles through the openings in the adjacent end walls, a discharge tube leading from the opening in the outer end wall of at least one receptacle, means within each receptacle forming an air passage leading along the end wall thereof and terminating at about the level of the tops of the respective wall openings, each passage having an intake opening communicating with the interior of the casing, and means for controlling the flow of air through the intake openings of the passages, said means being operable from both ends of the casing.

7. An unloader for a plurality of hopper-bottom vessels comprising a plurality of spaced, aligned receptacles formed with opposed end walls and downwardly convergent side walls, each receptacle being adapted to be connected to the hopper bottom of a vessel to receive material therefrom, the end walls of each receptacle having aligned openings at the lower ends thereof, a tube connecting the lower ends of each pair of adjacent receptacles through the openings in the adpacent end walls thereof, a discharge tube leading from the opening in the outer end wall of at least one of the end receptacles, means within each receptacle, including a vertical inner wall spaced from each end wall of the receptacle, forming air passages, terminating at about the tops of the respective end wall openings, each inner wall extending downwardly from the top of the receptacle and at least in part defining an opening at its lower end aligned with and of about the same size as the opening in the adjacent end wall, and means for admitting air into each passage above the lower end thereof.

8. In an unloader for use with a hopper-bottom vessel, the combination of a receptacle adapted to be mounted at the lower end of the hopper bottom to receive material from the vessel, the receptacle having opposed vertical end walls and downwardly convergent side walls, each end wall having an opening at its lower end, a tube connected to each end wall at the opening therein, means for admitting air into each tube to impinge on a sloping surface of material from the receptacle adjacent the end of the tube, said means, including a vertical inner wall spaced from each end wall of the receptacle, each inner wall and the adjacent end wall forming air passages terminating at about the level of the tops of the respective end wall openings, each inner wall extending downwardly from the top of the receptacle and at least in part defining an opening at its lower end aligned with and of about the same size as the opening in the adjacent end wall.

9. An unloading device for a hopper-bottom vehicle comprising a pair of vessels, a casing adapted to be mounted on the hopper bottoms of the vessels, a receptacle for each vessel within the casing, each receptacle having end walls and side walls, inner walls within the receptacle spaced between the end walls to form a passage for material from the vessel into the receptacle, a gate valve in the material passage to control the flow of material therethrough, an air passageway between each inner wall and the adjacent end wall of the receptacle, said air passageways extending downwardly from the top of the receptacle to adjacent the bottom, the upper portion of each wall having an air admission opening into the air passageway, a sliding valve controlling the passage of air through said air admission opening, the lower portion of each of said inner walls at least in part defining an opening, said valves having actuating means extending therefrom to adjacent the end of the casing for operation therefrom, a tube connected to openings in the lower portion of adjacent end walls of the two receptacles, a discharge tube mounted in openings in each of the outer end walls and extending therefrom for connection to a plant transport line.

PHILIP R. HORNBROOK.

References Cited in the file of this patent

UNITED STATES PATENTS

| Number | Name | Date |
|---|---|---|
| 2,030,553 | Tiley | Feb. 11, 1936 |
| 2,378,553 | Hornbrook | June 19, 1945 |
| 2,393,932 | Petroe | Jan. 29, 1946 |
| 2,418,302 | Hornbrook | Apr. 1, 1947 |
| 2,523,229 | Norbom | Sept. 19, 1950 |
| 2,629,637 | Hornbrook | Feb. 24, 1953 |

FOREIGN PATENTS

| Number | Country | Date |
|---|---|---|
| 688,286 | Germany | Jan. 25, 1940 |